United States Patent [19]

Ganga et al.

[11] Patent Number: 4,764,424
[45] Date of Patent: Aug. 16, 1988

[54] POLYAMIDE-COATED PARTICLES AND PROCESS FOR THEIR PREPARATION

[75] Inventors: Roland Ganga, Joinville Le Pont; Jacques Grossoleil; Jean-Paul Merval, both of Brionne, all of France

[73] Assignee: Atochem, Paris, France

[21] Appl. No.: 846,256

[22] Filed: Mar. 31, 1986

[30] Foreign Application Priority Data

Mar. 29, 1985 [FR] France ............................. 85 04739

[51] Int. Cl.$^4$ .......................... B05D 7/00; B32B 5/16
[52] U.S. Cl. ............................... 428/327; 148/101; 264/104; 264/123; 264/125; 264/126; 427/216; 427/220; 428/328; 428/329; 428/331; 428/406; 428/407

[58] Field of Search ............... 427/216, 220; 428/406, 428/407, 327, 328, 329, 331

[56] References Cited

U.S. PATENT DOCUMENTS

| | | | |
|---|---|---|---|
| 3,185,589 | 5/1965 | Damm | 427/216 |
| 3,421,931 | 1/1969 | Reverand et al. | 427/220 |
| 3,484,415 | 12/1969 | Sahler et al. | 528/326 |
| 3,705,871 | 12/1972 | Biensan et al. | 528/326 |
| 4,065,519 | 12/1977 | Koch | 428/900 |
| 4,216,263 | 8/1980 | Otis et al. | 428/383 |

*Primary Examiner*—James C. Cannon
*Attorney, Agent, or Firm*—Burgess, Ryan and Wayne

[57] ABSTRACT

Solid particles are coated with a uniform and continuous polyamide layer by immersion in a reaction medium capable of forming polyamides by anionic polymerization in solution.

20 Claims, 1 Drawing Sheet

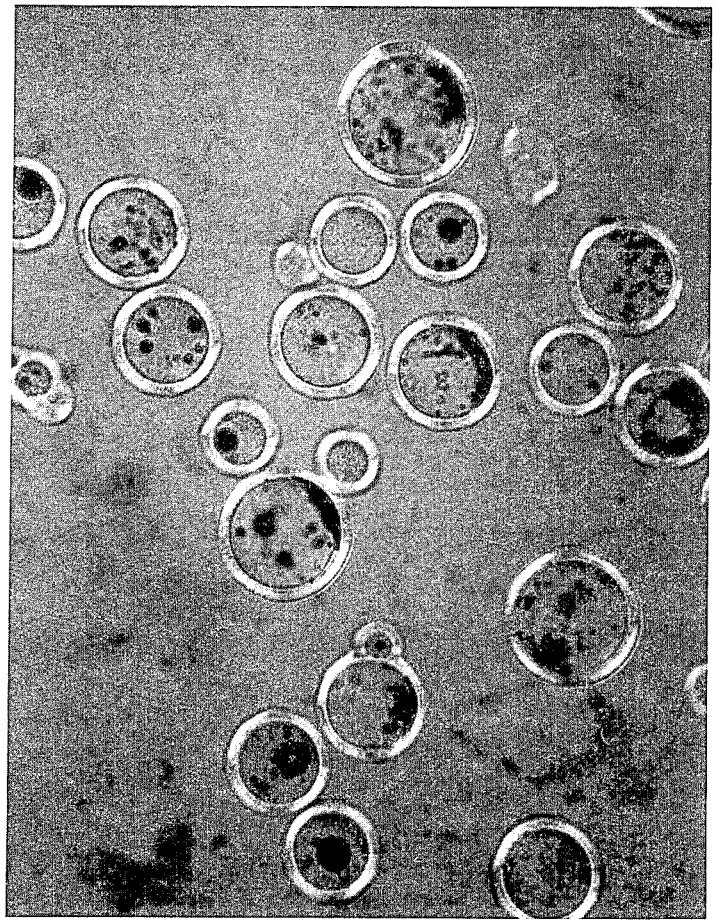

POLYAMIDE-COATED PARTICLES AND PROCESS FOR THEIR PREPARATION

Since, in addition to other advantageous properties, polyamides have remarkable mechanical properties, good inertness towards many chemical agents and excellent adhesion to many materials, attempts have already been made to coat particles of various materials with a polyamide layer to provide them with a coating which can serve either to protect them or to bind them to other materials by melting and cooling.

Unfortunately, it is not easy to produce such a coating. It is possible, for example, to mix particles of a substrate with molten polyamide in an extruder, to extrude rods of this mixture, to cool them, to granulate them and then to reduce these granules to powder by cryogenic grinding.

However, such a method has many disadvantages, the following of which may be mentioned:

in order that the mixture of polyamide and substrate shows good thermoplastic behaviour as it passes through the extruder, it must have a high content of polyamide, and this results in a thick and, moreover, nonuniform coating of the final particles, many of the particles are stripped bare during the grinding, and since the particles must not melt or react with the polyamide when passing through the extruder, their choice is limited.

Similarly, it has been proposed to coat copper wires with a thin layer of polyamide by passing these wires through a hot solution of polyamide in a cresol and subsequent drying (U.S. Pat. No. 4,216,263), and it would be possible to mix the particles to be coated in such solutions and to dry them, but the cresols (which are about the only effective solvents for polyamides) are dangerous substances and are difficult to remove and, in addition, the particles would stick together.

To overcome this, French Pat. (published as No. 2,258,263) proposes to mix the particles with solutions, in methyl alcohol or other solvents (which are easy to handle and are readily removable by subsequent drying), not of polyamides (which would be insoluble therein) but of copolyamides.

This process is simple; unfortunately, the particles which are obtained are coated with copolyamides, which do not have the same properties as the pure polyamides (higher water absorption, inferior resistance to chemical agents, and the like), and this can be inconvenient for certain applications; in addition, the coating is not uniform.

DESCRIPTION OF THE FIGURES

As detailed in Example 1 herein, the FIGURE depicts polymer coated particles produced by this invention.

The process which forms the subject of the present invention makes it possible to solve the problem posed, without giving rise to the abovementioned disadvantages. It makes it possible to obtain particles coated with a uniform layer of polyamide, which it has never been possible to obtain otherwise.

This process consists essentially in:

placing the particles of the substrate which is to be coated in suspension in a reaction medium capable of producing a polyamide or copolyamide by anionic polymerization in solution, that is to say a medium essentially comprising a lactam, a solvent for this lactam and an anionic catalyst, initiating anionic polymerization by the addition of an activator, and isolating, once the polymerization is complete, the particles of substrate on which the polyamide has come to be deposited in the course of its formation.

Such reaction media have been described in French Pat. Nos. 1,521,130 and 1,601,194, French Patent Application in the name of the Applicant Company No. 85/01,274 and DE OS No. 1,942,046.

Any lactam which produces a polyamide can be used in the invention; especially worth mentioning are those which have become of industrial importance: caprolactam, oenantholactam, capryllactam and lauryllactam.

It is also possible to use a mixture of two or more lactams, and this results in a coating of the substrate by a layer of copolyamide.

The solvent used has a boiling point between 80° and 200° C.; it may be an aliphatic hydrocarbon, for example of a paraffinic or a cyclic or aromatic type (such as xylene or toluene), halogenated or not.

It is essential that this solvent:

dissolves the lactam but not the substrate, and does not react with any of the compounds used in the process: catalyst, activator, lactam, substrate.

The catalyst may be sodium or one of its compounds, such as sodium hydride or sodium methylate.

The activator may be a lactam N-carboxyanilide, an isocyanate, a carbodiimide, a cyanimide, an acyllactam, a triazine, an urea, an N-substituted imide, an ester, and the like.

If appropriate, the polymerization reaction may be regulated by adding an N,N'-alkylenebisamide to the mixture, as claimed in French Patent Application No. 85/01,274.

No particle other than that of the substrate which is to be encapsulated should be introduced into the medium.

The substrate can be of very many kinds:

inorganic (glass beads, glass fibres, feldspar, calcium carbonate or magnesia particles, iron powder and the like)

or, organic (carbon fibres, particles of polymers such as polyvinyl chloride, polybutadiene, polyethylene, crosslinked polystyrene, cellulose derivatives, carbon black, and the like).

The substrate does not need to be uniform in shape; its surface may be smooth or covered with asperities.

No particular density is needed, so long as the substrate can be kept in suspension in the reaction medium by the stirring which is applied thereto; thus, copper or nickel powders, though very dense, can be coated without difficulty.

The essential point is that it should be solid, insoluble in the reaction mixture and inert towards this mixture; in particular, it must not introduce any trace of water.

Thus, when it is intended to coat glass beads or glass fibres which are, in most cases, already coated with a size, it is essential to make sure, using analyses or preliminary tests, that this size does not interfere with the reaction.

As will be seen in Example 5 below, it is possible to coat particles of substances which are not completely inert towards the catalyst. It suffices to introduce these particles into the medium at a time when it no longer contains any catalyst, that is to say after the catalyst has reacted with the lactam to convert it into a lactamate.

In the examples mentioned below, the purpose of which is to illustrate the invention without, however, limiting it, the tests have been carried out in a reactor of 20-liter capacity, equipped with a blade stirrer, a jacket through which heating oil is circulated, a bottom draining system and an air lock, swept with dry nitrogen, for introducing reactants.

A device for azeotropic distillation under vacuum enables all traces of water to be removed from the reaction medium.

The solvent used is a paraffin hydrocarbon cut with a boiling range of between 130° and 160° C.

The molecular weight of the polyamide layer deposited is determined by measuring the inherent viscosity, at 25° C., of a solution of 0.5 g of this layer in 100 g of m-cresol.

EXAMPLE 1

Coating of solid glass beads

The beads used, marketed by the Microbeads AG Company under reference PF 11 R, have a density of 2.45 and a mean diameter of 26 microns.

Their surface has been treated with a coupling agent of the "Silane" type which, as has been shown by a preliminary test, is inert towards the reaction medium and thus does not interfere with polyamide deposition.

The following are added in succession into the reactor, under nitrogen, at room temperature and with gentle stirring:
  10 liters of solvent,
  1,500 grams of PF 11 R glass beads,
  1,500 grams of caprolactam.

The bath temperature is raised to 110° C., and this temperature is maintained for 60 minutes at a stirring speed of 360 revolutions/minute so that all the caprolactam dissolves, 100 cc of solvent are distilled off to remove azeotropically any water which might be present, atmospheric pressure is restored, 28.67 grams of 50% pure sodium hydride are added, the reactor is heated to 130° C. and, with the stirring speed being continually maintained at 360 revolutions/minute, a solution of 82 grams of stearyl isocyanate in 1.9 liters of solvent is added at a uniform rate over 4 hours.

Once this injection has been completed, the temperature of 130° C is maintained for another 30 minutes, the reactor is cooled to 100° C., stirring is discontinued, the reactor contents are drained into a filter to separate off the solvent, the powder obtained is dried at 90° C. under vacuum, is treated with 1,500 cc of a 3% strength aqueous solution of phosphoric acid in order to neutralize the alkaline catalyst residues and is dried again.

As shown by the attached photograph, taken through an optical microscope, this powder consists of the glass beads introduced, coated with a very uniform and very regular layer of nylon 6, 3 to 5 microns in thickness.

Furthermore, the inherent viscosity of this polyamide layer has been found to be 0.82.

EXAMPLE 1 bis

Example 1 is repeated, but by introducing 300 g of glass beads and 1,500 g of caprolactam, and this leads to the use of 20 grams of sodium hydride and 82 cc of stearyl isocyanate.

Since the polyamide/glass beads ratio is higher than in the preceding example, the glass beads are coated with a thicker final layer of polyamide, 6 of 8 microns instead of 3 to 5. The viscosity of this layer is 0.71.

EXAMPLE 2

Coating of hollow glass beads

The beads used are hollow glass beads sold by the Microbeads AG Company under reference GL, unsized, with a mean diameter of 47 microns and a density of 0.35.

The procedure is as in Example 1 above, but with
  300 grams of these hollow beads,
  2,700 grams of caprolactam,
  25.2 grams of 50% sodium hydride,
  122.94 grams of stearyl isocyanate.

The beads which initially float on the surface of the bath disperse therein as soon as stirring is established at 360 revolutions/minute. When the operation is complete, microbeads are obtained which are covered with a very uniform and continuous layer, 6 microns thick, of nylon 6 with an inherent viscosity of 0.75.

EXAMPLE 2 bis

In this case, the hollow beads are 70 microns in diameter. The operating conditions remain unchanged, except that 22.9 grams of hydride are used.

The final layer of nylon 6 is 6 microns thick and has a viscosity of 0.80.

EXAMPLE 3

Coating glass fibres

The procedure is the same as in the preceding examples but with the autoclave charged with 500 grams of glass fibres supplied by the Vetrotex Saint-Gobain Company under the name Vetrotex EC 10 N 99, approximately 10 microns in diameter and in lengths of between 30 and 250 microns.

2,700 grams of caprolactam and 25.2 g of 50% sodium hydride are added to these glass fibres and then polymerization is effected by adding 122.94 grams of stearyl isocyanate.

Once the operation is complete, glass fibres are obtained which are coated over their entire length and at the ends with a layer of nylon 6 with a thickness of 5 microns.

EXAMPLE 4

Coating of ground magnetic iron oxide particles, with a diameter of betwen 10 and 30 microns.

2.840 liters of solvent are introduced into a 5-liter reactor, followed, in succession, by
  80 g of lauryllactam,
  1,069 g of iron oxide
  1 g of N,N'-ethylenebisstearamide.

Stirring is adjusted to 350 rev/min and the bath temperature is raised to 110° C.

After 500 cc of solvent have been distilled azeotropically at a reduced pressure of 200 torr, 3.0 g of 80% pure sodium hydride are introduced under nitrogen. A temperature of 110° C. is maintained for 30 minutes, is reduced to 100 C. and injection of 8.5 g of stearyl isocyanate is carried out over 2 hours at this temperature. Once the injection is complete, the temperature is raised again to 110° C. for 1 hour.

After cooling, phase separation and drying, a homogeneous powder is obtained with a particle size distribution between 12 and 35 microns.

All the oxide particles have been coated with a layer of nylon 12, with an inherent viscosity of 0.81.

EXAMPLE 5

Coating of PVC (polyvinyl chloride) particles

The PVC particles used have been produced by the suspension process, have been perfectly dried before use and have a mean diameter of 20 microns.

The reactor which was used in Examples 1 to 3 is used again to coat them with nylon 12.

Since preliminary tests have shown that these particles are not completely inert towards sodium hydride, they are introduced only after the reaction of the hydride with the lactam, which leads to the formation of sodium lactamate.

The operating procedure is then as follows: after the reactor has been charged with:

10 liters of solvent,
88.3 g of N,N'-ethylenebisstearamide and
2,850 g of lauryllactam, the materials have been dissolved with stirring at 105° C., and 100 cc of solvent have been distilled off, 13.88 g of 50% pure sodium hydride are introduced, 150 g of PVC are introduced under nitrogen and, while the mixture is maintained at a temperature of 105° C. and is stirred at 360 revolutions/minute, a solution of 89.3 g of stearyl isocyanate in 2 liters of solvent is introduced over 4 hours.

After washing and drying as in Example 1, a powder consisting of PVC particles coated with a perfectly uniform layer of nylon 12, with an inherent viscosity of 0.62, is finally obtained. The PVC particles which were not spherical to begin with have become spherical; their mean diameter has increased from 20 to 26 microns.

EXAMPLE 5 bis

By following a similar procedure, but without using N,N'-ethylenebisstearamide and with 300 g of PVC, 2,700 of lauryllactam, 9.86 of hydride and 94 of isocyanate, coated PVC particles with a diameter of 40 microns are obtained; the viscosity of the nylon 12 layer is 1.77.

Substrates coated in this manner can be put to various uses:

1. The solid glass beads of Example 1 and the glass fibres of Example 3 can be used for reinforcing composite materials. When these materials are fabricated, it will suffice to heat them to a temperature slightly above that of the melting point of the polyamide forming the coating and to cool them, to produce good bonding between the glass beads or fibres and the materials with which they are in contact.

2. Using the polyamide-coated iron oxide powder of Example 4, permanent magnets of any desired shape can be readily manufactured by compressing this powder in a mould, heating the component for a few minutes to 185° C. so as to melt the polyamide completely, and allowing to cool.

An original application related to ideas of this kind, and which also forms the subject of the present invention, consists in using polyamide-coated metal powders instead of pure polyamide powders for the manufacture of the supple composite materials claimed in French Patent Application No. 84/05,627 in the name of the Applicant Company, the contents of which are incorporated in the present description.

Up to 35 percent by weight of copper powders 3 to 5 microns in diameter, 13 microns after coating with a layer of nylon 12, or nickel powders 12 microns in diameter, 25 microns after coating, can be used in the manufacture of the abovementioned supple composites, making it possible, after the latter have been converted into slabs by assembly, melting and cooling, to obtain materials consisting substantially of polyamide, glass fibres and uniformly distributed metallic greases, and this endows them with advantageous electrical or electromagnetic properties.

3. PVC powders coated with nylon 12 of Examples 5 and 5 bis can be used advantageously in cosmetics to replace talc.

We claim:

1. A process for the preparation of polyamide-coated particles which comprises the steps of
   (a) suspending uncoated particles in a medium containing (i) at least oen lactam, (ii) a solvent in which the lactam is soluble and (iii) an anionic polymerization catalyst capable of polymerizing said lactam,
   (b) contacting said medium with an activator to initiate polymerization,
   (c) heating said medium with stirring to a temperature and for a period of time to effect polymerization of said lactam; and
   (d) recovering said polyamide-coated particles.

2. The process of claim 1 wherein said uncoated particles are selected from the group consisting of solid or hollow glass beads, glass fiber segments, magnetic iron oxide powders, metal powders and polyvinyl chloride powders.

3. The process of claim 2 wherein said uncoated particles are solid glass beads.

4. The process of claim 2 wherein said uncoated particles are hollow glass beads.

5. THe process of claim 2 wherein said uncoated particles are glass fibre segments.

6. The process of claim 2 wherein said uncoated particles are metal powders.

7. The process of claim 2 wherein said uncoated particles are magnetic ion oxide powders.

8. The process of claim 2 wherein said uncoated particles are polyvinyl chloride powders.

9. The process of claim 1 wherein said lactam is caprolactam.

10. The process of claim 1 wherein said lactam is oeantholactam.

11. The process of claim 1 wherein said lactam is caprylactam.

12. The process of claim 1 wherein said lactam is lauryllactam.

13. The process of claim 1 wherein said solvent is an aliphatic hydrocarbon.

14. The process of claim 1 wherein said solvent is an aromatic hydrocarbon.

15. The process of claim 1 wherein said catalyst is a sodium compound.

16. The process of claim 1 wherein said activator is selected from the group consisting of a lactam N-carboxyanilide, an isocyanate, a carbodiimide, a cyanimide, an acyllactam, a triazine, an urea, an N-substituted imide and an ester.

17. Solid particles having a uniform coating of polyamide and prepared by the process of claim 1.

18. The solid particles of claim 17 which are polyamide-coated glass beads.

19. The solide particles of claim 17 which are polyamide coated metal oxides.

20. A reinforced composite material containing as a reinforcing member, the solid particles of claim 17.

* * * * *